United States Patent [19]
Cech

[11] 3,775,097

[45] Nov. 27, 1973

[54] METHOD OF EXTRACTING A METAL FROM A MATERIAL CONTAINING THE METAL IN ELEMENTAL FORM

[75] Inventor: Robert E. Cech, Scotia, N.Y.

[73] Assignee: Copper Range Company, New York, N.Y.

[22] Filed: Apr. 15, 1971

[21] Appl. No.: 134,412

[52] U.S. Cl.................... 75/103, 75/112, 75/117, 299/5, 423/493
[51] Int. Cl. ... C22b 15/10, C22b 15/00, C01a 3/04
[58] Field of Search.................... 75/103, 117, 112; 23/97, 87 R; 423/493

[56] References Cited
UNITED STATES PATENTS

| | | | |
|---|---|---|---|
| 3,186,833 | 6/1965 | Cech | 75/103 X |
| 3,212,883 | 10/1965 | Cech et al. | 75/103 X |
| 3,492,115 | 1/1970 | Mahalla | 75/117 X |

OTHER PUBLICATIONS
J. Inorg. Nucl. Chem., 1964, Vol. 26, pp. 1157–1163.

Primary Examiner—Edward Stern
Attorney—Gerald Altman, Richard J. Oates and Herbert L. Bello

[57] ABSTRACT

A method of extracting a metal, such as copper, from ore tailings or scrap metal containing the metal in elemental form. The copper-containing material is enclosed in a sealed enclosure and is initially heated by steam to a temperature generally in the range of 50° C to 100° C. The material is then contacted with an ammonia-containing vapor which serves to dissolve the copper oxide and basic carbonate film on the elemental copper and forms a coating of a copper-ammine complex. Subsequently, the material is exposed to chlorine gas and the copper-ammine complex serves to transport the chlorine to the copper surface in a form such that a rapid chlorination of the copper occurs. The copper chloride is then leached from the material and the copper is recovered from the leaching solution by conventional techniques.

17 Claims, No Drawings

METHOD OF EXTRACTING A METAL FROM A MATERIAL CONTAINING THE METAL IN ELEMENTAL FORM

BACKGROUND OF THE INVENTION

This invention relates to a method of extracting a metal from a material containing the metal in elemental form, and more particularly to the extraction of copper from ore tailings located within the interior of abandoned or worked-out mines.

Ore tailings, which is the residue of the copper mining operation, contain small amounts of metallic copper, up to perhaps 1.5 percent by weight. With the increase in the price of copper, attempts have been made to recover or extract the copper from the tailings. In some cases the tailings are located in piles above ground and recovery of the copper is economically feasible. However in other cases the tailings have been dumped back into the chambers of the abandoned mines and it is uneconomical to remove the tailings from the mine to recover the copper. Thus, no economical method has been devised to extract the copper from the ore tailings located within the abandoned mines.

Copper recovery is also important in scrap metals. Various scrap parts may contain mixtures of copper and other metals and due to the high price of copper it is desirable to recover the copper by inexpensive procedures.

SUMMARY OF THE INVENTION

The invention is directed to an economical process of recovering copper from scrap metal or from copper ore tailings within a mine or on the ground, or from the walls or shafts of abaondoned mines. According to the process of the invention, the copper-containing material is maintained in a sealed or air-tight enclosure and is subjected to a series of vapor treatments. In the preferred form of the invention, the copper-containing material is initially heated with steam to a temperature in the range of 50°C to 100°C. The steam treatment, by raising the temperature of the copper-containing material, enables the subsequent reactions to proceed at a more rapid rate and also serves to remove soluble salts, as well as grease or oil when scrap metal is used, from the copper containing material.

Following the steam treatment, the copper-containing material is treated with an ammonia-containing gas to remove the protective film of copper oxide or basic copper carbonate that is normally found on the elemental copper after exposure to the elements for extended periods of time. The ammonia reacts with the copper oxide or basic copper carbonate film to produce a copper-ammine complex which is retained on the copper surface as a coating or film.

Following the ammonia treatment, the material is subjected to the action of chlorine gas, and with the protective film replaced by a non-protective film of copper ammine complex the chlorine gas is able to reach the copper and react with it, forming copper chloride.

In a few cases the ore deposit may be of such a nature that acids may be used in place of vaporized ammoniated liquors to remove oxide and carbonate protective films on the metallic copper. These cases would include ores that contain only small amounts of acid consuming materials and certain forms of scrap metal in which the foreign matter does not react with acid.

The copper chloride is leached from the material by spraying or trickling a leaching solution, such as ammoniated ammonium chloride, ammoniated alkali chloride, or ammoniated ammonium carbonate over the material. In some instances a vapor leaching operation can be performed after the liquid leaching in order to remove all the remaining traces of the copper chloride.

The copper can then be removed from the leaching solution by conventional techniques, which in itself does not form a part of the invention.

The process of the invention utilizes inexpensive compounds to recover the copper without any appreciable loss of reactants.

The process can be used to recover elemental copper or silver from a wide variety of materials, including ore tailings, scrap metals and metallic deposits in the walls or shafts of abandoned mines.

DESCRIPTION OF THE PREFERRED EMBODIMENT

While it is contemplated that the invention is applicable to the recovery of copper or silver, the following description is directed to the recovery of copper, but the recovery of silver from silver-bearing materials can be accomplished by similar methods.

The metallic copper deposits in ore tailings, or the like is normally covered by a protective copper oxide or basic copper carbonate film. This protective film is developed during prolonged exposure of the metallic copper to the atmosphere.

In carrying out the invention the copper-containing material, such as ore tailings, or scrap metals, is maintained in a sealed or air-tight enclosure, so that the copper-bearing material can be subjected to successive treatments with gases or liquids.

When dealing with copper ore located in the walls of abandoned or worked mines, or when dealing with ore tailings located within the mine, the mine can be converted to a substantially air-tight enclosure by constructing suitable bulkheads in the mine openings. It is also necessary when dealing with abandoned or worked out mines to provide a drainage system in which drainage pipes or channels are provided so that all liquids resulting from the condensation of vapors can be collected in sumps and pumped back to ground level.

When the copper-containing material is in the form of scrap metal or ore tailings located above ground, the process can be carried out in a manufactured enclosure, such as a brick lined metal tank having a suitable drainage system constructed in the floor of the tank so that the condensed vapors will drain to collection points or sumps where they can be withdrawn from the tank. Alternately, if large quantities of ore tailings are to be treated above ground, the tailings can be supported on a suitable grid work for collection of condensed vapors, and covered by a tent-like cover of chemically resistant plastic sheeting to form a substantially air-tight enclosure around the pile of tailings.

In the preferred form of the process, the copper-containing material is initially heated to a temperature in the range of 50°C to 100°C. The heating is preferably achieved by introducing live steam into the enclosure, although other methods of heating can be utilized. The heating serves to raise the temperature of the mass so that subsequent reactions achieved by the introduction of the vapors will proceed at a more rapid rate. In addition, the steam will also serve to dissolve or remove soluble salts contained in the mass of material, and when dealing with scrap metals, the steam has the added function of removing grease and oil from the scrap.

The copper-containing material or tailings are then treated with an ammonia containing fluid, such an anhydrous ammonia gas, vaporized ammonium hydroxide, or vaporized ammoniated ammonium carbonate liquor, or alternately ammonia and carbon dioxide to produce the vaporized ammonium carbonate in situ. In addition, other ammoniated liquors containing excess ammonia in the form of dissolved ammonia or ammonium hydroxide can be employed in the vaporized form, such as ammonium chloride; ammonium sulfate; ammonium nitrate; alkali-metal carbonates, sulfates, bicarbonates, chlorides, or nitrates; and alkaline earth metal carbonates, bicarbonates, chloride or nitrates. For maximum effectiveness, the excess ammonia should exceed 10 grams/liter but as little as 2 grams/liter will be effective in removing the protective film on the metallic copper.

The ammonia vapor acts to dissolve or remove the naturally-occurring protective film of copper oxide or basic copper carbonate that is normally found on the metallic copper. It is not the primary purpose of the ammonia treatment to effect a significant dissolution of the elemental copper, although some disolution will occur to form a copper-ammine complex on the copper surface. The ammonia treatment is continued until all of the copper oxide or basic copper carbonate coating on the copper surface has been converted to the copper-ammine complex.

The remaining ammonia vapor can then be flushed from the enclosure by introducing steam into the enclosure. The steam acts to wash a portion of the soluble copper-ammine complex from the material where it can be collected in sumps and pumped into storage tanks. However, it is not necessary to wash the copper-ammine complex solution from the material in order to proceed with the subsequent treatment, for it has been discovered quite unexpectedly that the presence of the copper-ammine complex in the form of a film adhering to the surface of the metallic copper materially enhances the rate of chemical reaction between the metallic copper and the chlorine vapor subsequently introduced into the system.

Occasionally the ore may be of such a nature that strong mineral acids, such as hydrochloric, sulfuric or nitric can be used in place of the ammonia-containing vapor to remove the protective film on the copper. However, the use of mineral acids will only be effective with ores that contain only small amounts of acid consuming materials and certain forms of scrap in which the foreign matter will not react with the acids.

The chlorine gas or vapor is preferably introduced at the bottom of the enclosure so as to effect the displacement of the lighter gases in the system. One would normally expect that the chlorine gas would react with the copper-ammine complex to form ammonium chloride, but quite unexpectedly, this reaction does not occur. Instead, the copper-ammine complex does, for some reason not completely understood, serve to transport the chlorine to the copper surface in a form such that a rapid chlorination of the copper occurs to form both cupric and cuprous chloride. The copper chlorides are solids as formed in the system at temperatures of 100°C or lower, but because of the liquid copper-ammine complex in the system, the resulting chloride may be a mass having a paste-like consistency.

The treatment with chlorine gas is continued until measurements of gas consumption indicate that the conversion of the metallic copper to copper chloride is substantially complete. Alternately, the chlorine gas treatments may be terminated short of complete conversion so that some metallic copper remains for a subsequent treating cycle.

The chlorine gas treatment is terminated by slowly introducing generally inert gas into the system to replace the chlorine. The displacing gas can be carbon dioxide, nitrogen, or the like, Air can be used to displace the chlorine, but it is not preferred, as it will form oxychlorides. It is desirable to remove the chlorine from the system, particularly when subsequent treating cycles are to be performed, because the introduction of ammonia along with the chlorine gas could result in the formation of an explosive mixture.

The copper-chlorides are then leached from the system, and a wide variety of leaching solutions can be employed, such as an aqueous solution of ammoniated ammonium chloride, ammoniated sodium chloride, ammoniated ammonium carbonate, or the like. In some cases where the gangue is not acid soluble, dilute hydrochloric acid solutions or acidified sodium chloride solutions can be employed. The leaching is carried out by spraying or trickling the leaching solution over the material, or when dealing with small quantities of material not located in abandoned mines, the leaching can be performed by immersing the material in the leaching solution.

To remove the last traces of the copper chloride from the system, the matrial can be treated with a vapor, such as vaporized ammonoum hydroxide or vaporized ammoniated ammonium carbonate. This vaporized leaching treatment can be continued, but modified by introducing oxygen in the system along with the vapor, so as to form a new film of the copper-amine complex on the surface of any copper remaining undissolved in the material. After the formation of the copper-ammine complex, the processing can be repeated by introducing chlorine gas into the system.

It is contemplated that the process of the invention can be repeated through any number of cycles to completely remove all traces of the metallic copper from the copper-bearing material. If the temperature of the system decreases to a degree such that the chemical reactions are slowed, the aqueous leaching treatment may be followed by treatment with live steam to again raise the system temperature to the desired range.

The copper can be recovered from the leaching solutions by conventional recovery techniques, which in itself does not form a part of the present invention. One common method of recovering recovering copper from the leaching solution is to sparge hydrogen sulfide gas into the leach liquor. Copper sulfide precipitates which may then be collected by filtering the pulp. The hydrochloric acid generated in the precipitation process may be concentrated and sold as a by-product.

Another conventional method of copper recovery from the leaching liquor is to precipitate the copper as metallic copper powder by means of hydrogen gas in a high pressure, high temperature autoclave. During this process it is necessary to add ammonia for pH control. After the precipitation of the copper, the barren waste liquor consisting of ammonium chloride solution can be strengthened with added ammonia to form the solution needed in the leaching portion of the process.

While the above description has been directed to the treatment of the copper bearing material with an ammonia vapor to produce the copper-ammine complex on the copper surface, it is conceived that when dealing with smaller quantities of copper bearing material, such as scrap metals, and the like, the material can be immersed in a copper-ammine complex solution to similarly provide the desired film of the complex on the copper surface. Under these circumstances chlorine gas can be sparged into the tank containing the fully immersed material and the copper-ammine complex again functions in the manner previously described to transport the chlorine to the copper surface to provide a rapid formation of copper-chloride.

The following examples illustrate the process of the invention:

EXAMPLE NO. 1

A 4 pound sample of amygdaloid ore having the following rock size distribution was placed in a vapor-liquid tight plastic bag:

| Wt.range-grams | % | Wt. Range-grams | % |
|---|---|---|---|
| 0–20 | 29.5 | 140–160 | 2.5 |
| 20–40 | 6.5 | 160–180 | 0 |
| 40–60 | 11.5 | 180–200 | 11.0 |
| 60–80 | 7.0 | 200–220 | 3.0 |
| 80–100 | 10.0 | 220–240 | 3.5 |
| 100–120 | 1.5 | 240–260 | 0 |
|  |  | 260–280 | 14.0 |

The ore was subjected to alternate treatments with vaporized $NH_4OH$ solution (28 percent) and with $CO_2$ gas by passing these vapors over the ore in an alternating sequence. After three short cycles of vapor treatments small particles of a white material presumed to be ammonium carbonate, as well as occasional traces of blue copper ammine carbonate solution could be detected visually on the surface of the ore rocks. Also, a considerable release of moisture from the rocks was observed. This was taken as an indication that $NH_3$ was adsorbing on the rocks, thus releasing absorbed $H_2O$ which then drained off.

The sample was then treated with chlorine gas for 3 hours at a temperature of 50°C and then leached with $NH_4OH$ solution of 56 g. $NH_3/l$ of solution concentration. The copper dissolution rate on leaching was as follows:

| Days Leaching | Copper Dissolved (lbs..Cu/ton ore) |
|---|---|
| 1 | 4.2 |
| 2 | 4.8 |
| 3 | 5.0 |
| 4 | 5.1 |
| 7 | 5.4 |
| 9 | 5.6 |

EXAMPLE 2

A sample of amygdaloid ore, 4 pounds in weight and a similar size distribution as set forth in Example No. 1, was treated with chlorine gas for 3 hours at 50°C, without benefit of any pre-treatment. A subsequent leaching treatment with air saturated ammonium hydroxide solution (56 g $NH_3/l$) produced dissolution of only 0.06 lbs. cu/ton ore in 30 days of leaching, thereby indicating that without a chemical pre-treatment chlorine gas is prevented from reacting with native copper in amygdaloid ore.

EXAMPLE NO. 3

A 4 pound sample of amygdaloid ore having a size distribution similar to that of Example No. 1, was placed in a vapor-liquid tight plastic bag for processing by a sequence of liquid and vapor treatments.

The amygdaloid ore contains only small amounts of acid consuming materials, and accordingly, it was first leached for 24 hours with sulfuric acid solution having a concentration of 144 grams $H_2SO_4$ per liter to remove the protective film on the native copper surface. Copper dissolution by this treatment is insignificant, approximately 0.8 pounds copper per ton of ore. The acid solution was then drained off of the ore and 10 ml. of 28% $NH_4OH$ solution was vaporized by heating and passed over the ore charge to neutralize any acid remaining in the pores in the ore. The plastic bag containing gas inlet and outlet tubes was then sealed, submerged in water at 50°C and subjected to a treatment with chlorine gas for 3 hours to convert metal values to chlorides. A subsequent leaching treatment with $NH_4OH$ solution (56 g. $NH_3$/liter) saturated with air, dissolved copper in the following amounts:

| Days Leaching | Copper Dissolved (lbs. Cu/ton ore) |
|---|---|
| 1 | 3.7 |
| 2 | 4.5 |
| 3 | 4.8 |
| 6 | 5.5 |
| 8 | 6.3 |

EXAMPLE NO. 4

Short sections of copper pipe of 3.4 inch o.d. and 1.16 inch in thickness were immersed in an ammonium hydroxide solution. Air was passed into the vessel and after an extended period of time an opaque blue solution of the copper-ammine complex $Cu(NH_3)_4(OH)_2$ was formed. Subsequently, chlorine gas was introduced into the bottom of the vessel, and while the solution itself did not undergo any significant modification by the chlorine gas, a precipitate appeared which became more voluminous as the chlorine gas addition continued. A rapid temperature rise was observed due to the formation of copper chloride. After a period of 5 minutes of the chlorine treatment, the sections of the copper pipe, which were initially 100 grams in weight, were reweighed and found to have lost 18 grams of copper. This extracted copper had been converted to a precipitate of copper chloride.

The process of the invention provides an economically practical process of removing metallic copper from copper bearing matrials and particularly from ore tailings located in abandoned mines. It has been unexpectedly found that the copper-ammine complex film on the surface of the copper provides a unique function in that it enables the chlorine to be readily transported to the copper surface in a form such that a rapid chlorination of the copper occurs which would not normally occur if the copper bearing material was merely subjected to the chlorine gas treatment.

Various modes of carrying out the invention are contemplated as being within the scope of the following claims particularly pointing out and distinctly claiming the subject matter which is regarded as the invention.

I claim:

1. A method of recovering a copper metal in a substantially closed environment from a material containing said copper metal coated with a film including a copper compound selected from the class consisting of the oxides and the carbonates, said process comprising the steps of reacting said film with an ammonia containing fluid to develop a film of an ammine complex of said copper metal on the surface of said copper metal, contacting said material with chlorine vapor, said film of ammine complex acting to transport the chlorine to the surface of said copper metal to provide a rapid chlorination of said copper metal and to form chloride salts of said copper metal, removing said chloride salts from said material, and recovering said copper metal from said salts.

2. The method of claim 1, and including the step of heating the material to a temperature in the range of 50°C to 100°C prior to developing the film of said ammine complex.

3. The method of claim 2, wherein the heating is carried out by introducing steam into the material.

4. The method of claim 1, and including the step of initially sealing the material in a substantially air-tight enclosure.

5. The method of claim 1, wherein the material contains copper in an elemental form, and said material is located beneath ground within an abandoned mine.

6. The method of claim 5, wherein the mine is initially sealed off to provide a substantially air-tight enclosure.

7. The method of claim 1, wherein said ammine complex is developed by contacting the material with an ammonia-containing vapor, said ammonia-containing vapor is selected from the group consisting of ammonia gas, vaporized ammonium hydroxide and vaporized ammoniated ammonium carbonate liquor.

8. The method of claim 1, wherein the chloride salts are removed from the material by leaching with an aqueous leaching solution.

9. The method of claim 8, wherein the leaching solution is selected from the group consisting of ammoniated ammonium chloride, ammoniated sodium chloride, ammoniated ammonium carbonate, and mixtures thereof.

10. The method of claim 8, and including the step of leaching the material with a vaporized leaching material after leaching with said aqueous leaching solution.

11. A method of extracting a copper metal from a material containing said metal in elemental form, the outer surface of said metal having a naturally occuring protective film of oxides and carbonates, said method comprising the steps of enclosing the material in a substantially sealed enclosure, contacting the material with an ammonia containing fluid capable of removing the protective film, contacting the material after removal of said film with chlorine vapor, said chlorine vapor reacting with said metal to form water soluble chloride salts of said metal, leaching the chloride salts from said material by use of a leaching fluid, and recovering the elemental metal from the salts in said leaching fluid.

12. The method of claim 11, wherein said fluid is an ammonia-containing vapor.

13. A method of extracting a copper metal from a material containing said metal in elemental form, the outer surface of said metal having a naturally occuring protective film of oxides and carbonates, said method comprising the steps of enclosing the material in a substantially sealed enclosure, contacting the material with an ammonia containing fluid capable of removing the protective film, contacting the material after removal of said film with chlorine vapor, said chlorine vapor reacting with the metal to form water soluble chloride salts of said metal, leaching the chloride salts from said material by use of a leaching fluid, and recovering the elemental metal from the salts in said leaching fluid, the ammonia-containing vapor being flushed from the enclosure prior to contacting the material with chlorine vapor.

14. The method of claim 1, wherein the material is metallic scrap and said metal is selected from the group consisting of copper and silver.

15. A method of extracting a copper metal from a material containing said copper metal in elemental form, the outer surface of said metal having a naturally occuring protective film of oxides and carbonates, said method comprising the steps of enclosing the material in a substantially sealed enclosure, contacting the material with an ammonia containing fluid capable of removing the protective film, contacting the material after removal of said film with chlorine vapor, said chlorine vapor reacting with the metal to form water soluble chloride salts of said metal, leaching the chloride salts from said material by use of a leaching fluid, and recovering the elemental metal from the salts in said leaching fluid, said method including the step of introducing steam into the enclosure to heat the material prior to contacting the material with the ammonia-containing vapor.

16. A method of recovering copper from a copper-bearing material located in a mine, comprising the steps of sealing the openings in the mine to provide a substantially air-tight enclosure, introducing an ammonia-containing vapor into the sealed mine to remove the oxide film on the surface of the copper and form a film of a copper-ammine complex on the copper surface, removing the ammonia-containing vapor from the sealed mine, introducing chlorine gas into the mine, said film of ammine complex acting to transport the chlorine to the surface of the copper to provide a rapid chlorination of the copper and form copper chloride salts, introducing a leaching fluid into the mine to leach the salts from the material, collecting the leaching fluid, and recovering the copper from the leaching fluid.

17. The method of claim 16, wherein said ammonia-containing vapor is a vaporized ammoniated liquor containing an excess ammonia in an amount greater than 2 grams/liter.

* * * * *